E. ASHLEY.
HEAD GATE.
APPLICATION FILED SEPT. 21, 1909.
966,154.
Patented Aug. 2, 1910.
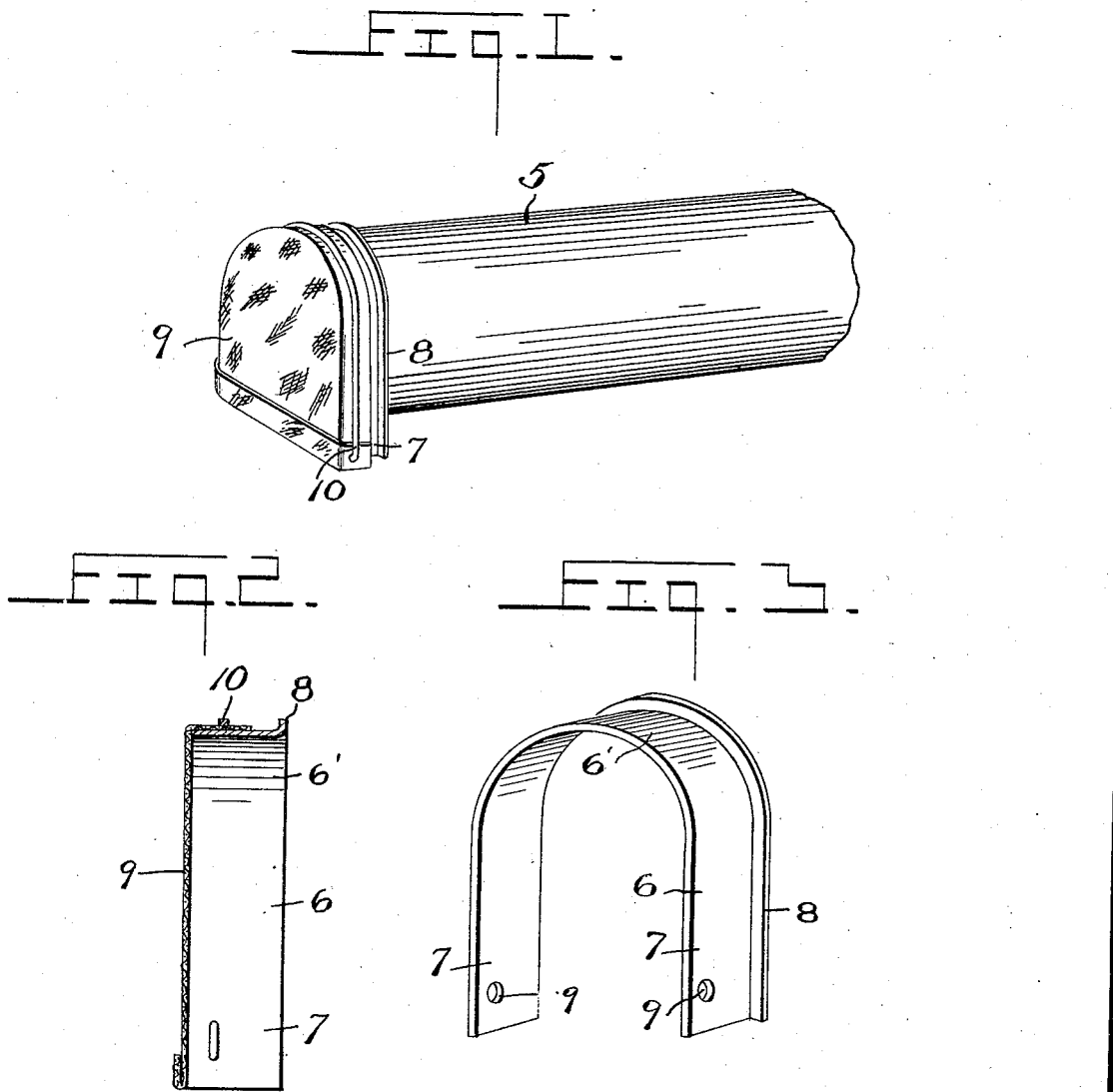

UNITED STATES PATENT OFFICE.

EDWARD ASHLEY, OF BOISE, IDAHO.

HEAD-GATE.

966,154.  Specification of Letters Patent.  Patented Aug. 2, 1910.

Application filed September 21, 1909.  Serial No. 518,793.

*To all whom it may concern:*

Be it known that I, EDWARD ASHLEY, a citizen of the United States, residing at Boise, in the county of Ada and State of Idaho, have invented certain new and useful Improvements in Head-Gates, of which the following is a specification.

This invention has relation to certain new and useful improvements in flume gates and has for its object to provide a simply constructed device of this character which is particularly adapted for use in irrigation ditches and is designed to be attached to one end of the water pipe or tube, to regulate the flow of the water therethrough.

Another object is to provide a flume gate which is adapted to be held in position by the action of the water to securely close the flume when it is desired to entirely shut off the supply.

A further object is to provide a device of this character comprising a single length of resilient sheet metal upon which and extending across the outer face thereof is secured a piece of canvas or other water proof material.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification and in which like numerals of reference indicate similar parts in the several views, Figure 1 is a perspective view showing the gate secured upon the end of the water pipe. Fig. 2 is a vertical longitudinal section of the device. Fig. 3 is a detail perspective view of the gate frame.

Referring to the drawing 5 indicates the pipe or flume, over the entrance opening of which my improved gate is placed. In the irrigation of lands for agricultural purposes these water tubes are positioned in ditches into which the water is turned from the source of supply.

The gate comprises a single length of resilient sheet metal 6 bent into a U-shaped form. The parallel vertical sides 7 of this frame are bent outwardly at their rear edges, to form a strengthening rib 8 which is adapted to securely engage with the sides of the tube, the spring action of the upper curved portion 6' holding the vertical sides in position against accidental displacement. The upper end of the frame is engaged with the periphery of the tube. A sheet of canvas or other water proof material 9 is disposed over the front edge of the frame and is securely fastened thereto by means of the circumscribing binding wire 10. The canvas is tightly drawn across the frame, and the ends of the wire passed through the canvas and the perforations 9 in the lower ends of the sides 7. The ends of the wire are bent or clenched upon the inner face of the sides, thus securely fastening the canvas on the frame. It will be noted that at the lower end of the gate the canvas is doubled to more effectually prevent the entrance of water therethrough when the supply has been shut off. When it is desired to only partly stop the flow of water, the gate is raised until the lower edge thereof is drawn above the flume opening. The increased thickness of material will prevent the ripping or tearing of the canvas which might occur owing to the strength of the current, and just the proper amount of water will be admitted to the flume.

The resiliency of the gate frame and the strengthening ribs of the sides thereof will at all times hold the gate yieldingly in position. The ribs 8 also prevent the binding wire 11 from rearward movement upon the frame, thus avoiding the liability of the canvas being released therefrom by the flow of the water.

From the foregoing it will be seen that I have provided a flume gate which is extremely simple in construction, whereby the water flow may be regulated to suit varying conditions of the ground which is being irrigated. The canvas covering may be readily renewed when the same has become unfit for further use. The device is very durable and efficient in operation and may be manufactured at an extremely low cost.

What is claimed is:

1. A flume gate comprising a sheet metal resilient frame having strengthening ribs on opposite sides, a canvas covering adapted to be drawn across the outer edge of the frame and means for securing the covering to said frame, said frame being adapted to have clamping engagement upon a water conveying tube.

2. A flume gate comprising a resilient sheet metal frame bent in substantially U-shaped form, the parallel sides of said frame having clamping engagement with a water conveying tube, a water proof covering adapted to be stretched across the outer edge of the frame, the gate being vertically movable over the entrance opening of the tube to control the water flow.

3. A flume gate comprising a substantially U-shaped sheet metal frame, the vertical side of said frame being reduced in width and adapted to engage at opposite sides upon the periphery of a water conveying tube, a canvas covering disposed across the outer edge of the frame, a binding wire adapted to secure the covering upon the outer surface of the frame, the extremities of said wire extending through the covering and the lower ends of the frame and clenched upon the inner surfaces thereof, the gate being vertically movable over the flume opening to control the water flow.

4. A flume gate comprising a substantially U-shaped sheet metal resilient frame, the rear edge of each of the vertical parallel sides of said frame being outwardly bent to form strengthening ribs, a canvas covering adapted to be stretched across the outer edge of said frame, the lower ends of said covering being transversely doubled or increased in thickness, a circumscribing binding wire disposed over the covering upon the outer surface of said frame, said wire having its ends extended through the covering and through apertures in the lower ends of said frame to secure the covering thereon, the gate being vertically movable over the entrance opening of the flume to regulate the water flow therethrough.

In testimony whereof I affix my signature, in presence of two witnesses.

EDWARD ASHLEY.

Witnesses:
W. J. TATE,
LEWIS B. ROGERS.